April 2, 1968     R. J. SCHWELLER     3,376,404
METHOD OF MANUFACTURING SHOCK ABSORBER SUBASSEMBLIES
Filed July 15, 1964     2 Sheets-Sheet 1
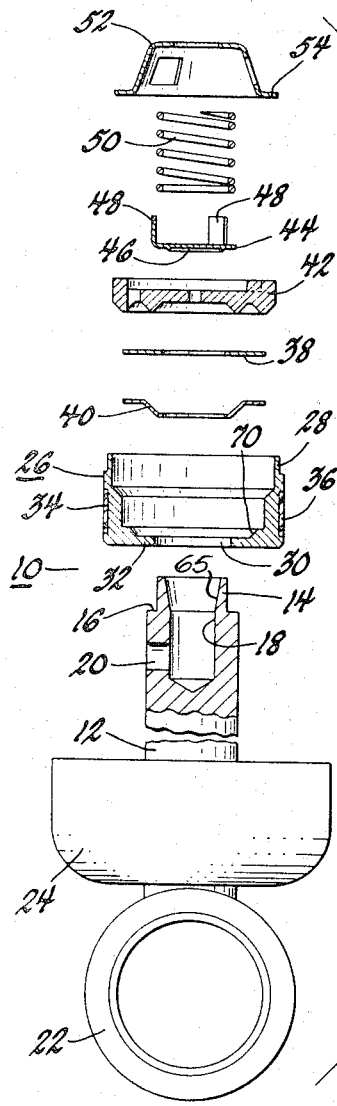
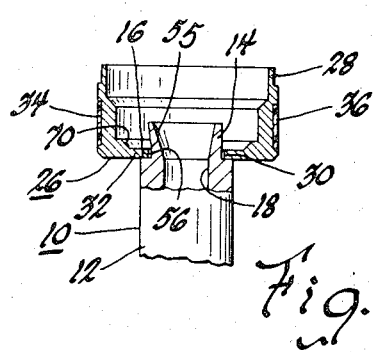
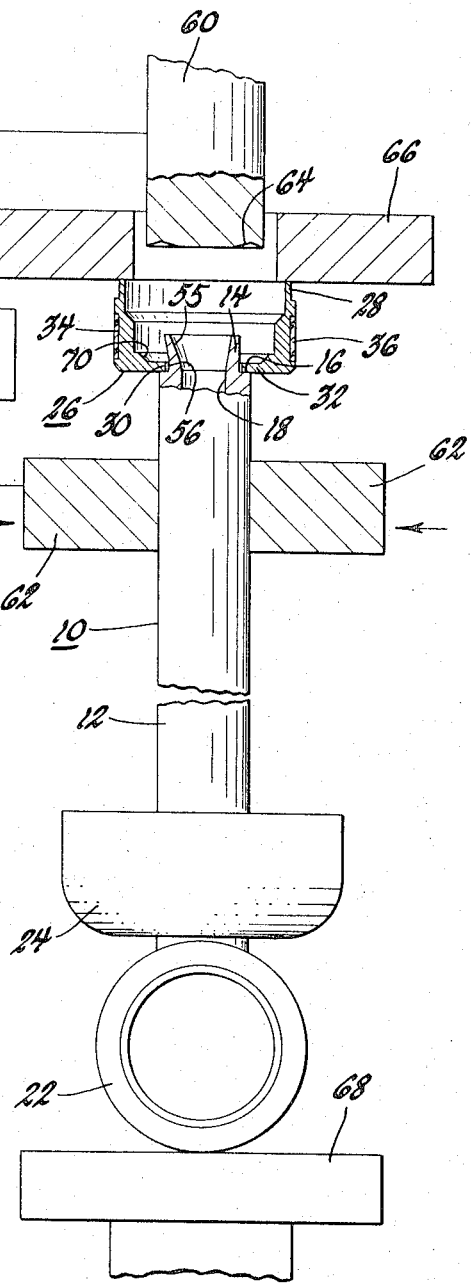
INVENTOR.
Robert J. Schweller
BY
J. C. Evans
HIS ATTORNEY

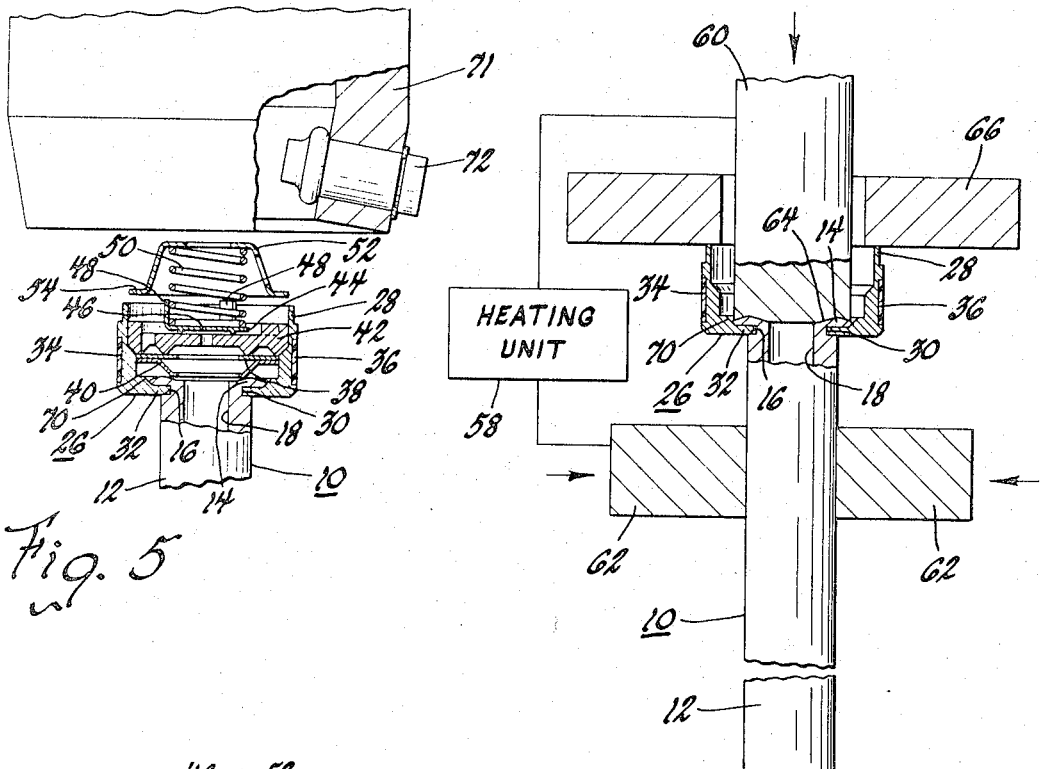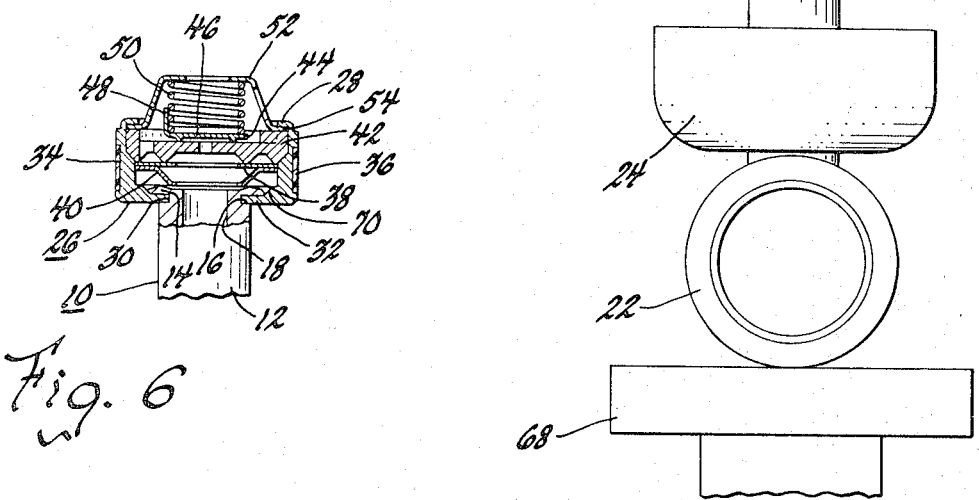

United States Patent Office 3,376,404
Patented Apr. 2, 1968

3,376,404
METHOD OF MANUFACTURING SHOCK ABSORBER SUBASSEMBLIES
Robert J. Schweller, Dayton, Ohio, assignor to General Motors Corporation, Detroit, Mich., a corporation of Delaware
Filed July 15, 1964, Ser. No. 382,801
2 Claims. (Cl. 219—107)

ABSTRACT OF THE DISCLOSURE

In preferred form, a method for manufacturing shock absorber subassemblies having a piston member with a layer of nylon on its cylindrical periphery comprising the steps of wetting the nylon layer to prevent contraction thereof during processing sufficient to remold the nylon sleeve, loosely connecting the piston member to a tubular end extension on a piston rod and electrically heating the extension and forming it to connect the piston rod to the piston member while concurrently thermally insulating the extension from the piston rod and controlling electrical heating to produce a resultant heat transfer to the nylon layer below that capable of producing blistering of the moistened nylon layer.

---

This invention relates to the manufacture of shock absorber assemblies and more particularly to the manufacture of a shock absorber subassembly including a piston member having a preassembled moisture absorbing seal sleeve of a heat destructible material connected to an associated piston rod member.

Recent development in the manufacture of shock absorbers and the like have included an improved method for manufacturing a piston subassembly wherein a moisture absorbing seal sleeve is preassembled on the piston by improved methods as disclosed in Karlgaard Patents Nos. 3,088,555 and 3,093,891, issued May 7, 1963, and June 18, 1963, respectively. Such units have been found to be unusually desirable in shock absorbers since they have improved sealing characteristics and unusually good dimensional characteristics that prevent binding of the unit within its associated cylinder.

An object of the present invention is to simplify the manufacture of shock absorber assemblies having piston members with such nylon seal sleeves thereon by an improved method that substantially reduces the cost of connecting the piston member to a piston rod member.

A further object of the present invention is to connect a piston member having a preassembled nylon sleeve thereon to a piston rod having an axial opening therethrough for directing all of the damping fluid in the shock absorber from one side of the piston member to the other by means of an improved heat forming method wherein a portion of the piston rod member is heat formed into engagement with the piston member without causing a temperature increase in the piston member capable of undesirably affecting a preassembled moisturized nylon seal sleeve therein.

A further object of the present invention is to connect a piston member of a shock absorber wherein a piston member has a preassembled nylon seal sleeve thereon to a piston rod member by means of an improved heat forming method that substantially eliminates fusion welding between the piston and piston rod members and controls the moisture in the nylon seal sleeve and the temperature the piston member and seal sleeve during the connecting process to avoid overheating the moist sleeve to cause it to blister.

Further objects and advantages of the present invention will be apparent from the following description, reference being had to the accompanying drawings wherein preferred embodiments of the present invention are clearly shown.

In the drawings:

FIGURE 1 is a view in vertical section showing the parts of a subassembly in a direct, double-acting hydraulic shock absorber in an exploded relationship.

FIGURE 2 is a view in vertical section showing a piston member and a piston rod member of the subassembly in their initial relationship during the method of assembly of the present invention.

FIGURE 3 is a view of a piston member and piston rod member, partially in section, prior to being connected together by a heat forming step in the method of the present invention.

FIGURE 4 is a view of the piston member and piston rod member during the heat forming steps in the method of the present invention.

FIGURE 5 is a fragmentary view in vertical section of the end of the subassembly with hydraulic dampening valve elements of the subassembly shown located within the piston member prior to being fastened therein.

FIGURE 6 is a fragmentary view in vertical section showing the end of the subassembly with the piston member, piston rod member and valve members in their assembled positions.

Referring now to the drawings, in FIGURE 1, a shock absorber subassembly 10 is illustrated including a piston rod member 12 that includes a small diameter tenon portion 14 thereon which defines an annular rod shoulder 16 in surrounding relationship therewith. In the illustrated embodiment of the invention, an opening 18 is directed axially through the tenon 14 into the large diameter portion of the rod 12 where it intersects a transverse port 20 in the rod whereby a dampening fluid flow passageway is provided from the end of the piston rod 12 to a point that is axially spaced from the end of the rod. The opposite end of the rod 12 is shown connected to a ring fitting 22 that is adapted to supportingly receive a bearing member connected to the sprung mass of a vehicle. Above the ring 22 is located an upper end closure member 24 slidably supported upon the rod 12.

The subassembly 10 further includes a piston member 26 having an open upper end formed by a thin sectioned portion 28 of the continuous side wall thereof through which the valving components of the subassembly are inserted and an opening 30 formed by an annular end wall portion 32 of the piston member 26. Continuously formed around the outer periphery of the piston is a groove 34 that supportingly receives a thin sectioned seal sleeve 36 that is made of a heat destructible nylon material. The nylon seal sleeve 36 is preassembled on the piston unit prior to its assembly in the shock absorber subassembly 10 by the method of preassembling more specifically set forth in Patent No. 3,093,891, issued June 18, 1963, to Karlgaard and as noted therein has a nylon seal which is hygroscopic and is manufactured to obtain desired dimensional tolerances by machining under conditions of high humidity.

Shown in FIGURE 1, in exploded relationship to the pistons 26, are the members of an insertable hydraulic dampening valve assembly including an annular valve member 38 located between an annular spring member 40 and a centrally apertured valve plate 42. On the other side of the valve plate 42 is located a stamped valve 44 having a base portion 46 that is received within the centrally apertured valve plate 42 and a plurality of spaced fingers or ears 48 which supportingly receive one end of a coil spring member 50 that has the opposite end thereof in engagement with the inner surface of a conically shaped valve assembly end member 52 that has an annular outwardly directed flange 54 thereon that is held between the thin sectioned wall portion 28 and one side of the valve plate member 42 when the unit is assembled, as best illustrated in FIGURE 6.

Past practice in assembling direct, double-acting hydraulic shock absorber subassemblies including a piston rod member, a piston member and a dampening valve assembly within the piston member has included the use of threaded connecting members, for example, nuts threaded on an extension of the piston rod or plugs threaded into the end of the piston rod and a piston rod threaded into the piston to obtain a completed subassembly. Such practices necessitate much inspection to eliminate small broken burrs or the like that result during the threading operations. This unduly increases the cost of the components of the subassembly and moreover influences the cost of assembling the subassembly. Additionally, such small metal particles can adversely affect the operation of the assembled shock absorber by floating interiorily of the shock absorber whereby valves can become jammed and seals can become worn prematurely.

In accordance with certain principles of the present invention, a method of assembling such parts of a shock absorber is contemplated wherein the piston rod and piston unit are joined by an economical and reliable heat forming process that eliminates such problems. The process, moreover, is especially suited for connecting piston members having preassembled seal sleeves thereon constructed from a heat destructible nylon material that absorbs moisture. The improved process generally includes the steps of controlling moisture in the sleeve; a preliminary loose connection of the piston rod member to the piston member; the maintenance of a space between the piston rod and the piston to prevent any significant heat transfer therebetween; a heating of a portion of the piston and a forming of the heated rod portion into engagement with an inner surface portion of the piston followed by a controlled cooling of the heated piston rod portion whereby the piston rod contracts with respect to the piston to effect a prestressed holding engagement of piston to rod.

One unit presently being assembled in accordance with the present invention includes a piston rod like 12 in FIGURE 1 of cold drawn steel having an outer diameter of .489 inch, a tenon having an outer diameter of .432 inch that extends .250 inch above the shoulder 16. The piston rod opening 18 is .240 inch in diameter and the transverse opening 20 has its centerline located .96 inch below the shoulder 16 and is of a .25 inch diameter. The piston 26 has an O.D. at the nylon seal sleeve 36 thereon of .999 inch; a means inside diameter of .83 inch in the vicinity of where the valve plate 42 is seated and an opening 30 that has a diameter of .438 inch. This representative subassembly is handled as follows.

First, the piston unit 26 is maintained under controlled humidity conditions to maintain a desired moisture by weight in the nylon sleeve to prevent undesirable blistering of the seal surface sleeve during connection to the piston rod. Further, the moisture in nylon sleeve 36 will prevent drying of the sleeve 36 during subsequent process steps and a resultant tightening of the sleeve on piston 26. In the unit under consideration the nylon sleeve contains no more than 2.5% by weight of moisture when assembled to the rod. With such moisture content, under normal conditions, of the disclosed process of assembly, undesirable blistering is substantially eliminated and further it will tend to prevent a relative thermal expansion between piston member 26 and sleeve 36 that might cold form or stretch sleeve 36 sufficiently to fit loosely on the piston 26.

The tenon 14 is then directed through the opening 30 in piston 26 and a portion of the tenon is staked over as at 55 in FIGURE 2 for loosely securing the piston 26 to the piston rod 12. In FIGURE 2 clearance existing between the outer surface of the tenon 14 and the end wall 32 of the piston 26 is exaggerated at 56 in FIGURES 2 and 3 to emphasize that the piston 26 is thermally insulated by direct heat conduction from the tenon 14 during the heat forming operation thereon.

With reference to FIGURE 3, a representative arrangement for heating the tenon 14 is illustrated including an electrical heating unit 58 having a movable electrode 60 and a clamp-type lower electrode 62 that grips the piston rod 12 in the vicinity of the transverse opening thereof. In the case of the specific unit being discussed, it is located so that the upper edge or surface of the electrode 62 is approximately .055 inch above that opening. The movable electrode 60 has a tenon engaging surface thereon including an annular groove 64 that has an inclination thereon to force the wall of the tenon 14 radially outwardly of the centerline of the piston rod. In the preferred construction, the opening 18 in rod 12 in part is formed by an inclined surface 65 which coacts with the electrode to prevent collapsing of the formed tenon into the opening 18 which might otherwise tend to affect adversely the characteristics of dampening fluid flow in the rod.

When the piston and rod of subassembly 10 is arranged with respect to the heating unit 58, the piston 26 is held against the underside of a fixed support portion 66 of the heating unit and the piston rod is loosely concentrically aligned within the piston by the gripping electrode 62. In the illustrated arrangement, a movable support 68 in the machine releasably holds the thin-sectioned wall 28 of the piston unit against the underside of the fixed support 66.

Once the piston unit 26 and piston rod 12 have been generally concentrically aligned, as illustrated in FIGURE 3, the movable electrode 60 is moved into engagement with the end of the small diameter tenon 14 and a desired heating of the tenon is carried out by means which, in the representatively illustrated practice of the invention, includes conditioning the heating unit 58 to effect the passage of twenty-three cycles of 10,000 amp current across the electrodes 60, 62. This heating cycle raises the temperature of the tenon 14 to a point just below its yield temperature and then pressure is applied through the electrode 60 to force or heat form the walls of the small diameter tenon 14 radially outwardly of the centerline of the rod 12 and against the inner surface of the end wall 32 as best shown in FIGURE 4. During this heating the clearance 56 between the tenon 14 and the piston 26 prevents any substantial heat conductive interchange therebetween so that the piston remains substantially below the yield temperature of the tenon. Hence, there is no tendency for the heat destructible nylon sleeve to be adversely affected by the heat forming step of the improved method. Furthermore, heat forming the tenon in this manner produces concentricity between piston and rod. Moreover, the moisture in the sleeve 36 and the limited heat transfer assure that the sleeve 36 will not be remolded during processing to thereby fit loosely on the piston 26.

The illustrated step of heat forming also forces a portion of the tenon 14 to overlie an inclined face 70 on the piston 26 whereby the connection between piston rod 12 and the piston assembly 26 is effectively further strengthened because of the greater surface area contacted by the heat formed tenon portion of the piston rod 12.

Following the initial heating step, a post heat operation is carried out to effect a desired annealing of the connection. In the case of the specific subassembly under consideration, the post heat operation includes four phases each including an application of twenty cycles of 5000–6000 amps across the electrodes whereby the heat formed tenon is gradually cooled to maintain desired strength characteristics therein.

By virtue of the heating operation, as illustrated and discussed with reference to FIGURE 4, it is important to note that the heat formed and radially outwardly directed portion of the tenon 14 is not fused or welded with the end wall of the piston unit. Rather, since the piston unit 26 is relatively cold as compared to the heated tenon 14, when the tenon 14 cools, it contracts against the inner surface of the end wall 32 and biases it against the supporting shoulder 16 so as to effect a prestressed holding engagement of the piston unit 26 between heat formed tenon 14 and the shoulder 16. It has been found that such a connection between piston rod 12 and piston 26 has unusually good strength capabilities that completely meet a strength criteria for the unit under consideration including a connection tensile strength having a 6,000 pound minimum yield strength and a 10,000 pound minimum ultimate yield strength and also a fatigue life defined by a continuous cycling between 3,000 pounds tensile and 500 compression of 5,000 cycles without fracture or cracking of the connection between the piston rod 12 and the piston 26.

Following connection of the piston rod 12 to the piston 26, as shown in FIGURE 5, the unit is moved to a station where the thin sectioned wall 28 of the piston 26 is rolled to retain the previously assembled valve package within the interior of the piston 26. In FIGURE 5, this step is representatively shown as being carried out by means of a conventional roller head 71 having circumferentially spaced tools 72 thereon that spin roll the wall 28 over. Following the spin rolling step, the thin wall 28 is bent inwardly to overlie the annular flange 54 on the end retainer of the valve asembly and the valve components are held in an operative relationship within the piston 26 as clearly shown in FIGURE 6.

While the embodiments of the present invention as herein disclosed constitute preferred forms, it is to be understood that other forms might be adopted.

What is claimed is as follows:

1. A method for manufacturing shock absorber subassemblies or the like having a piston member with a layer of nylon on the cylindrical periphery thereof formed as an annular seal sleeve thereon, comprising the steps of, impregnating the seal sleeve with a moistening agent to control sleeve length, loosely connecting a reduced diameter tenon on the end of a shock absorber piston rod through an end opening formed by an annular end wall of the piston member, connecting the tenon on said piston rod across electrodes of an electrical heating unit, applying a predetermined electrical current across the tenon of the piston rod to heat it to a predetermined temperature, heat forming the heated tenon of the piston rod radially outwardly of the centerline of the piston rod into engagement with the inner surface of the end piston wall without fusion welding the tenon to the piston wall, thermally insulating the periphery of the tenon from the piston wall during the heat forming step to maintain the temperature of the piston member substantially below the hot flow temperature of the tenon whereby on cooling the heat formed portion of the tenon the end-to-end length of the piston rod will be shortened to effect a prestressed holding engagement of piston rod to piston member, retaining a moisturizing agent in the layer of nylon during the heat forming step to prevent thermal distortion of the sleeve, controlling the amount of moisturizing agent in the sleeve and the degree of thermal insulating between tenon and piston member to prevent blistering of the outer surface of the sleeve.

2. A method for manufacturing shock absorber subassemblies or the like having a piston member with a layer of nylon on the cylindrical periphery thereof formed as an annular seal sleeve, comprising the steps of, loosely connecting a tubular extension on the end of a piston rod through an end opening formed by the annular end wall of the piston member, supporting the piston member by a preformed surface on the piston rod that is in engagement with the outer surface of the annular end wall on the piston member, maintaining a predetermined nylon sleeve length by wetting the nylon layer with a moistening agent, electrically heating the tubular end extension to a predetermined temperature, thermal insulating the annular end wall of the piston member during the heating step, and controlling the degree of electrical heating and thermal insulation to produce a resultant heat transfer to the nylon layer below that capable of producing blistering of the moistened nylon layer.

References Cited
UNITED STATES PATENTS

| | | | |
|---|---|---|---|
| 1,578,019 | 3/1926 | Ellis et al. | 219—107 |
| 1,583,758 | 5/1926 | White | 219—107 |
| 1,587,445 | 6/1926 | Thomson | 219—150 |
| 2,237,121 | 4/1941 | Stine et al. | 219—150 |
| 2,765,395 | 10/1956 | Kurth et al. | 219—178 |
| 3,039,798 | 6/1962 | Carlson et al. | 219—107 |
| 3,093,891 | 6/1963 | Karlgaard | 29—156.5 |
| 3,132,237 | 5/1964 | Pribonic | 219—107 |

RICHARD M. WOOD, *Primary Examiner.*

W. D. BROOKS, *Assistant Examiner.*